(12) United States Patent
Hsueh et al.

(10) Patent No.: US 11,267,041 B2
(45) Date of Patent: Mar. 8, 2022

(54) AUTOMATIC RIVETING GUN AND METHOD OF OPERATING SAME

(71) Applicant: Shenzhen Fulian Fugui Precision Industry Co., Ltd., Shenzhen (CN)

(72) Inventors: Chiung-Hsu Hsueh, Hsinchu (TW); Shi-Mei Wen, Shenzhen (CN); Ri-Meng Li, Nanning (CN)

(73) Assignee: Shenzhen Fullan Fugui Precision Industry Co., Ltd., Shenzhen (CN)

( * ) Notice: Subject to any disclaimer, the term of this patent is extended or adjusted under 35 U.S.C. 154(b) by 26 days.

(21) Appl. No.: 16/878,837

(22) Filed: May 20, 2020

(65) Prior Publication Data

US 2021/0299738 A1    Sep. 30, 2021

(30) Foreign Application Priority Data

Mar. 27, 2020    (CN) .......................... 202010231989.2

(51) Int. Cl.
| | | |
|---|---|---|
| *B21J 15/28* | (2006.01) | |
| *B21J 15/32* | (2006.01) | |
| *B21J 15/04* | (2006.01) | |
| *B21J 15/10* | (2006.01) | |

(52) U.S. Cl.
CPC ............. *B21J 15/28* (2013.01); *B21J 15/043* (2013.01); *B21J 15/105* (2013.01); *B21J 15/32* (2013.01)

(58) Field of Classification Search
CPC combination set(s) only.
See application file for complete search history.

(56) References Cited

U.S. PATENT DOCUMENTS

| 4,363,250 A | * | 12/1982 | Suga ....................... B25B 23/10 |
| | | | 81/453 |
| 10,894,285 B2 | * | 1/2021 | Li ............................ B21J 15/22 |
| 2020/0122223 A1 | * | 4/2020 | Li ........................... B21J 15/105 |

FOREIGN PATENT DOCUMENTS

| CN | 101612642 | * | 12/2009 | |
| CN | 101612642 A | | 12/2009 | |
| CN | 102240771 | * | 11/2011 | ............ B21J 15/043 |
| CN | 202539457 | * | 11/2012 | ............ B21J 15/043 |
| CN | 202539457 U | | 11/2012 | |
| CN | 102240771 B | | 4/2013 | |
| CN | 106903258 | * | 6/2017 | ............ B21J 15/043 |
| CN | 106903258 A | | 6/2017 | |
| CN | 207577342 | * | 7/2018 | |
| CN | 207577342 U | | 7/2018 | |
| JP | 2005-059076 A | | 3/2005 | |
| JP | 2005059076 A | * | 3/2005 | |
| TW | I677386 B | | 11/2019 | |
| TW | 202015828 | * | 5/2020 | |

* cited by examiner

*Primary Examiner* — Bayan Salone
(74) *Attorney, Agent, or Firm* — ScienBiziP, P.C.

(57) ABSTRACT

An automatic riveting gun and a method of operating same are disclosed, the automatic riveting gun includes a gun body including a rivet cavity, a front cavity, and a main cavity; a rivet clamping assembly is disposed on the gun body adjacent to the rivet cavity; a front-dynamic structure is movably disposed in the rivet cavity and the front cavity and a main-dynamic structure is movably disposed in the front cavity and the main cavity. The front-dynamic structure includes a claw sleeve. A claw mechanism is movably disposed in the main-dynamic structure. A front elastic element provides an elastic force to the claw mechanism and a main elastic element provides an elastic force to the main-dynamic structure.

10 Claims, 15 Drawing Sheets

AUTOMATIC RIVETING GUN AND METHOD OF OPERATING SAME

FIELD

The subject matter herein generally relates to automatic riveting guns and an operating method thereof.

BACKGROUND

Riveting guns, a type of tool for riveting of various metal plates, pipes, and other manufactures, are widely used in riveting of mechanical and electrical products such as automobiles, aviation, railways, refrigeration, elevators, switches, instruments, furniture, and decoration. A conventional riveting gun requires manual installation of rivet pin into the riveting gun, which has low operation efficiency, and reduces the production efficiency of product. In another conventional art, a feeding mechanism is mounted to a riveting gun, and the operation parts of the feeding mechanism are completely exposed, presenting safety hazards and increasing the risk of personnel being mechanically injured.

In general, the speed of riveting has a critical impact on the production efficiency of product. Therefore, in order to improve the production efficiency of product, it is necessary to provide a solution to improve riveting guns, so that the riveting guns can achieve rapid riveting objects, exhausting rivet rods, and feeding rivets.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
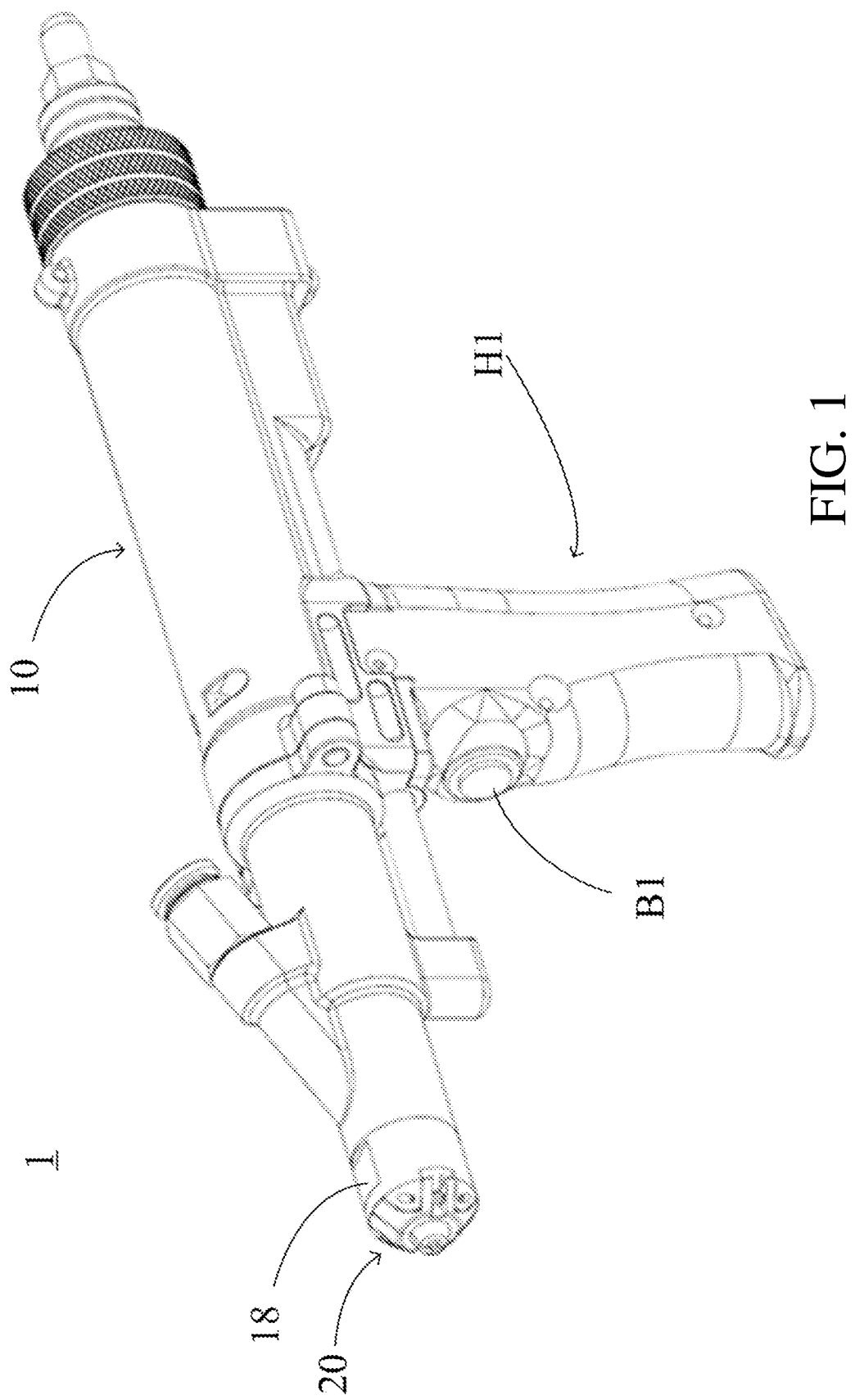
FIG. 1 is a perspective view of an automatic riveting gun in accordance with a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

The term "connected" is defined as directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
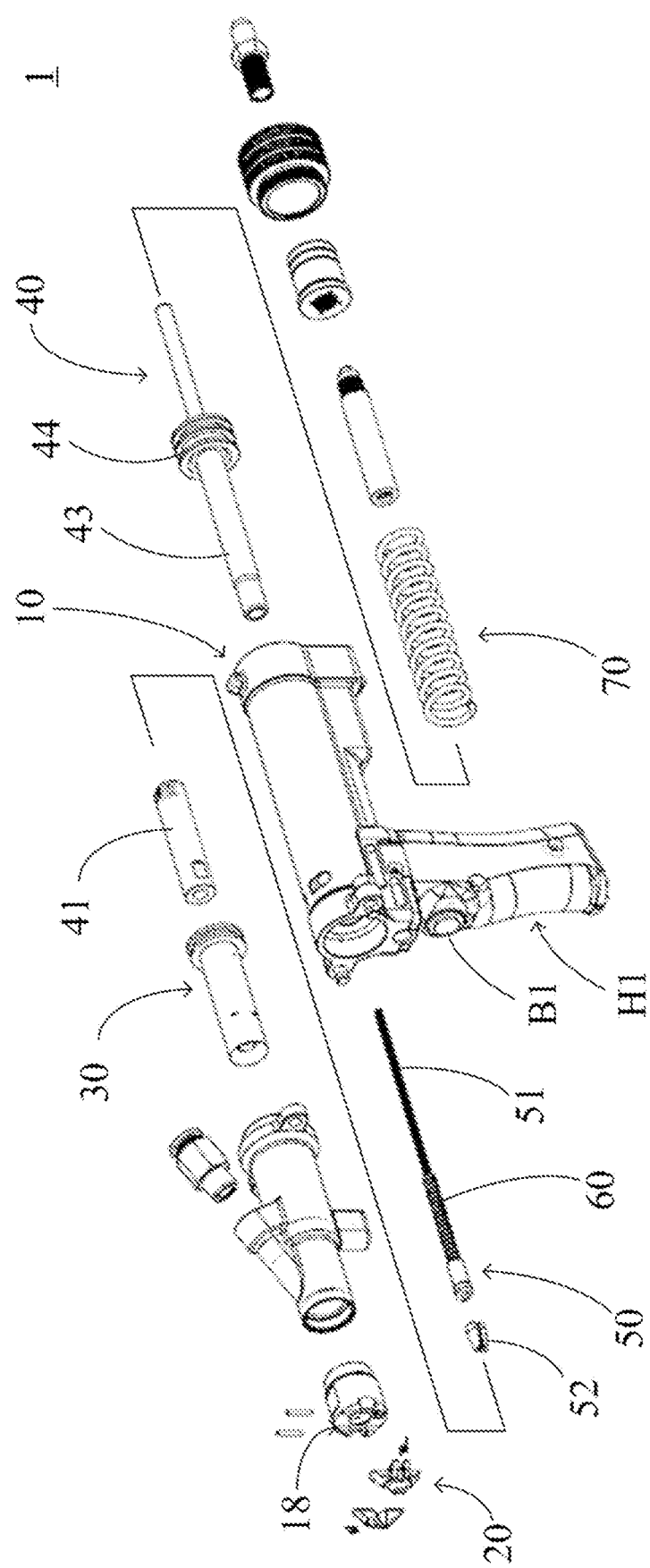
FIG. 2 is an exploded view of the automatic riveting gun of FIG. 1.
Figure 3:
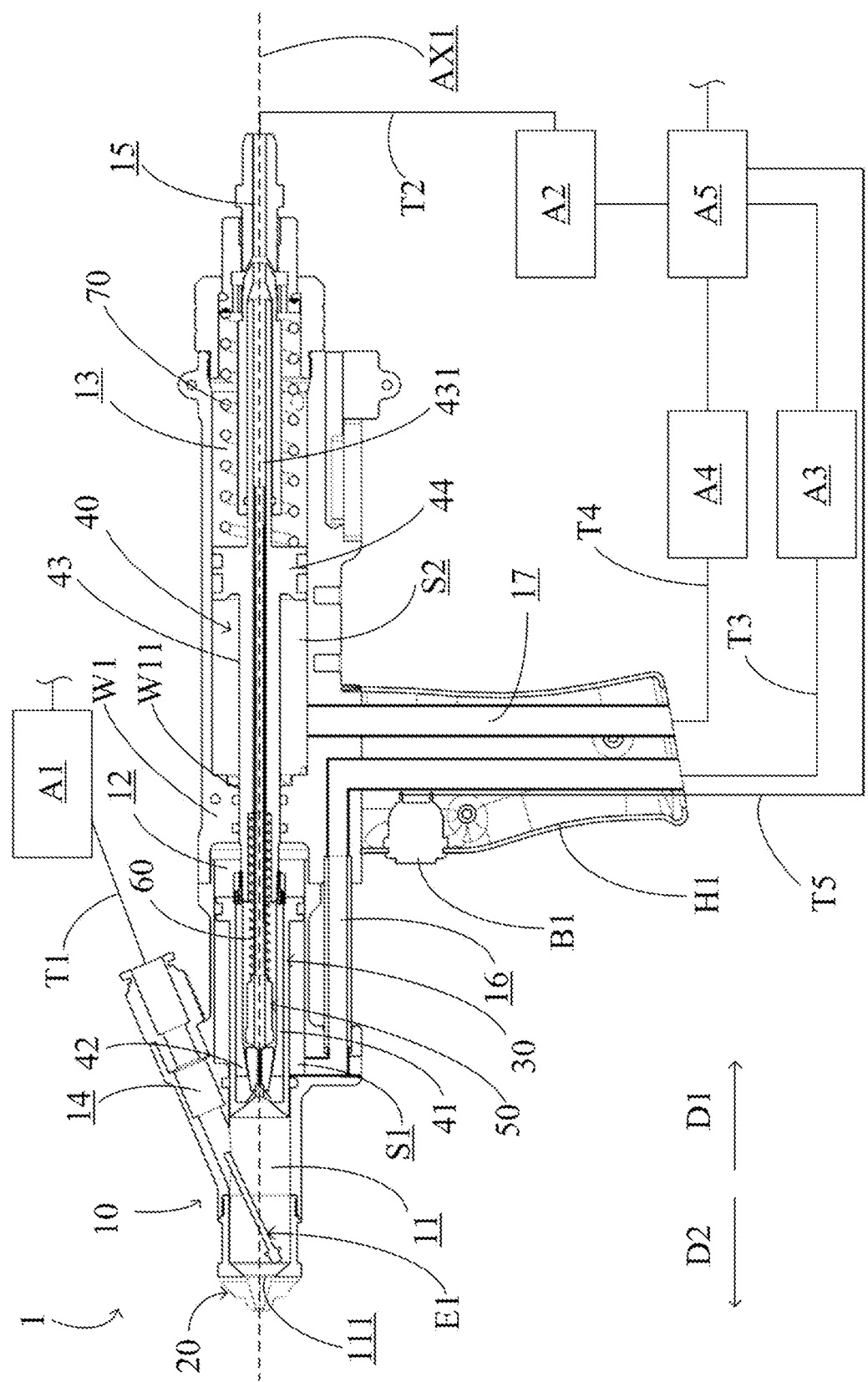
FIG. 3 illustrates a system for automatic riveting in accordance with the first embodiment of the present disclosure.

FIG. 1 is a perspective view of an automatic riveting gun (automatic riveting gun 1) in accordance with a first embodiment of the present disclosure. FIG. 2 is an exploded view of the automatic riveting gun 1 of FIG. 1. FIG. 3 illustrates a system for automatic riveting in accordance with the first embodiment of the present disclosure. The automatic riveting gun 1 combines two objects with a rivet pin E1. The automatic riveting gun 1 of the present disclosure utilizes various dynamic forces to achieve automatic and rapid operation, such as riveting objects, vacuum-extracting rivet rods, and feeding rivets.

The automatic riveting gun 1 includes a gun body 10, a rivet clamping assembly 20, a front-dynamic structure 30, a main-dynamic structure 40, and a claw mechanism 50. The gun body 10 substantially extends along an imaginary central axis AX1. In the present disclosure, the term "substantially extends" includes the means of "extends". The gun body 10 includes a rivet cavity 11, a front cavity 12, a main cavity 13, an inlet channel 14, a vacuum channel 15, a front channel 16, and a main channel 17. The rivet cavity 11, the front cavity 12, the main cavity 13, and the vacuum channel 15 are arranged along the imaginary central axis AX1. Moreover, the imaginary central axis AX1 can pass through the centers of the rivet cavity 11, the front cavity 12, the main cavity 13, and/or the vacuum channel 15.

The rivet cavity 11 is located at a front side of the gun body 10, and configured to receive the rivet pin E1. The rivet cavity 11 may be a cylinder extending along the imaginary central axis AX1. The rivet cavity 11 has a front opening 111 at a front end of the gun body 10. The rivet pin E1 can pass through the front opening 111, and protrude over the front end of the gun body 10.

The front cavity 12 is in communication with the rivet cavity 11. In this embodiment, the front cavity 12 is in direct communication with the rivet cavity 11. The front cavity 12 may be a cylinder extending along the imaginary central axis AX1. In this embodiment, a volume of the front cavity 12 is greater than a volume of the rivet cavity 11, and a diameter of the front cavity 12 is greater than a diameter of the rivet cavity 11. In some embodiments, the volume of the front cavity 12 is 1.1 times to 2 times the volume of the rivet cavity 11. In this embodiment, the volume of the front cavity 12 is 1.1 times to 1.6 times the volume of the rivet cavity 11.

The main cavity 13 is in communication with the front cavity 12. In this embodiment, a partition wall W1 of the gun body 10 is between the main cavity 13 and the front cavity 12. The main cavity 13 is in communication with the front cavity 12 via a through hole W11 of the partition wall W1. The main cavity 13 may be a cylinder extending along the imaginary central axis AX1. In this embodiment, a volume of the main cavity 13 is greater than the volume of the front cavity 12, and a diameter of the main cavity 13 is equal to or substantially equal to the diameter of the front cavity 12. In some embodiments, the volume of the main cavity 13 is 1.5 times to 5 times the volume of the front cavity 12. In the present disclosure, the term "substantially equal to" includes the means of "equal to". The term "substantially equal to" includes the range from −5% to +5% of a value.

The inlet channel 14 is in communication with the rivet cavity 11. The inlet channel 14 is inclined relative to the imaginary central axis AX1. The inlet channel 14 is connected to a rivet-supply device A1 via a pipe T1. The rivet-supply device A1 is configured to feed the rivet pin E1 into the inlet channel 14 via the pipe T1, and the rivet pin E1 enters into the rivet cavity 11 via the inlet channel 14.

The vacuum channel 15 is in communication with the main cavity 13, and extends along the imaginary central axis A1. In this embodiment, the vacuum channel 15 extends into the main cavity 13. The vacuum channel 15 is connected to a vacuum device A2 via a pipe T2. The vacuum device A2 provides a suction force to the vacuum channel 15 via the pipe T2. A rivet rod E11 of the rivet pin E1 in the gun body 10 can be taken out of the gun body 10 via the vacuum channel 15 by the suction force.

The front channel 16 is in communication with the front cavity 12. The front channel 16 is connected to a front-dynamic device A3 via a pipe T3. The front-dynamic device A3 transmits front-force fluid into the front channel 16 via the pipe T3, and the front-force fluid flows into the front cavity 12 via the front channel 16. The front-force fluid may be a gas or liquid. In this embodiment, the front-force fluid is a gas which can be air.

The main channel 17 is in communication with the main cavity 13. The main channel 17 is connected to a main-dynamic device A4 via a pipe T4. The main-dynamic device A4 transmits main-force fluid to the main channel 17 via the pipe T4, and the main-force fluid flows into the main cavity 13 via the main channel 17. The main-force fluid may be a gas or liquid. In this embodiment, the main-force fluid is a liquid which can be oil.

In this embodiment, the automatic riveting gun 1 further includes a handle H1 and a button B1. The handle H1 is disposed on the gun body 10. The front channel 16 and the main channel 17 may extend into the handle H1, and the pipe T3 and the pipe T4 may be in communication with the front channel 16 and the main channel 17 via a bottom of the handle H1. The button B1 is disposed on the handle H1, and the button B1 is electrically connected to a control device A5 via a signal line T5. In some embodiments, the automatic riveting gun 1 does not include the handle H1. The button B1 is disposed on the gun body 10.

The control device A5 is electrically connected to the rivet-supply device A1, the vacuum device A2, the front-dynamic device A3, and the main-dynamic device A4. When the button B1 is pressed, the button B1 emits a trigger signal to the control device A5 via the signal line T5. After the control device A5 receives the trigger signal, the control device A5 controls the operations of the rivet-supply device A1, the vacuum device A2, the front-dynamic device A3, and the main-dynamic device A4.

Figure 4:
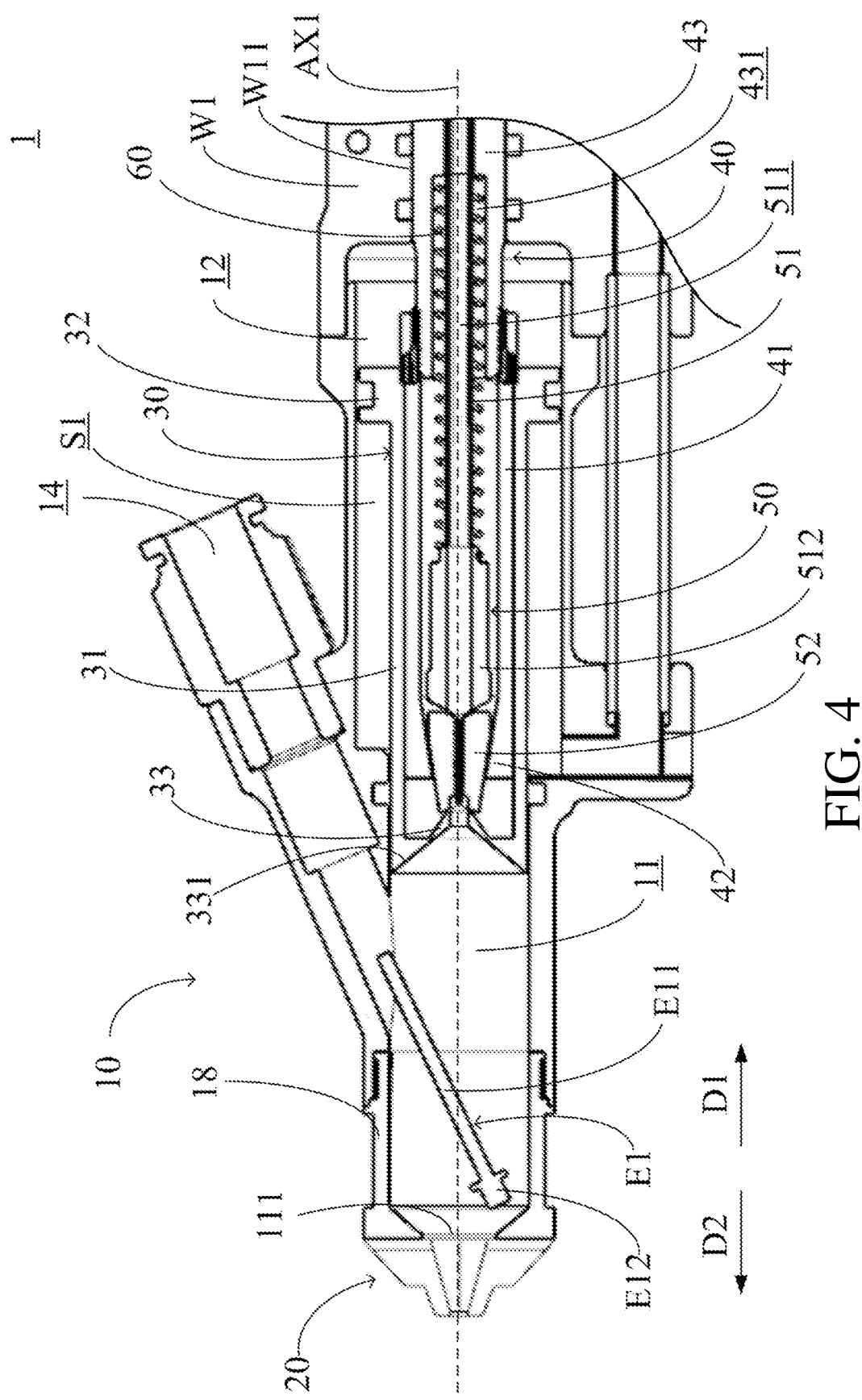
FIG. 4 is a cross-sectional view of partial automatic riveting gun of FIG. 1.

FIG. 4 is a cross-sectional view of partial automatic riveting gun 1 of FIG. 1. The rivet clamping assembly 20 is disposed on the front end of the gun body 10, and adjacent to the rivet cavity 11. The rivet clamping assembly 20 clamps the rivet pin E1 that passes through the front opening 111. The front-dynamic structure 30 is movably disposed in the rivet cavity 11 and the front cavity 12, and extends and is movable along the imaginary central axis AX1. The front-dynamic structure 30 includes a front sleeve 31, a front piston 32, and a blocking portion 33. The front sleeve 31 is movably disposed in the rivet cavity 11 and the front cavity 12, and extends and is movably along the imaginary central axis AX1. The front sleeve 31 contacts a side wall of the rivet cavity 11, and can slide along the side wall of the rivet cavity 11. Moreover, the front sleeve 31 is movably disposed on a claw sleeve 41 of the main-dynamic structure 40.

The front piston 32 is disposed on the front sleeve 31, and contacts a side wall of the front cavity 12. In this embodiment, the front piston 32 surrounds a rear end of the front sleeve 31, and can slide along the side wall of the front cavity 12. A front-dynamic space S1 is formed between the front piston 32 and a front end of the front cavity 12, and the front channel 16 is in communication with the front-dynamic space S1. The front-dynamic device A3 applies a front force to the front-dynamic structure 30 via the front channel 16, thereby moving the front-dynamic structure 30.

In this embodiment, the front-dynamic device A3 can adjust the pressure in the front-dynamic space S1 of the front cavity 12 via the front channel 16, so as to move the front-dynamic structure 30. The front-dynamic device A3 can provide the front-force fluid to the front-dynamic space S1 via the front channel 16. When the front-dynamic device A3 provides the front-force fluid to the front-dynamic space S1, the pressure in the front-dynamic space S1 is increased, and thus the front-force fluid pushes the front piston 32 to move in a first direction D1. In other words, the pressure generated by the front-force fluid in the front-dynamic space S1 forms the front force.

The blocking portion 33 is disposed in the front sleeve 31, and located at a front end of the front sleeve 31. The blocking portion 33 extends toward the imaginary central axis AX1, and is separated from the imaginary central axis AX1. Moreover, the blocking portion 33 is configured to block claws 52 of the claw mechanism 50.

The main-dynamic structure 40 is movably disposed in the front cavity 12 and the main cavity 13, and extends and is movable along the imaginary central axis AX1. Moreover, the main-dynamic structure 40 can be moved into the rivet cavity 11. The main-dynamic structure 40 includes the claw sleeve 41, a pressing element 42, a main rod 43, and a main piston 44 (as shown in FIG. 3). The claw sleeve 41 is movably disposed in the front cavity 12, and extends and is movable along the imaginary central axis AX1. Moreover, the claw sleeve 41 can be moved into the rivet cavity 11. The claw sleeve 41 is in the front-dynamic structure 30. In this embodiment, the front sleeve 31 surrounds all or at least a portion of the claw sleeve 41. The claw sleeve 41 contacts an inner wall of the front sleeve 31, and can slide along the inner wall of the front sleeve 31.

The pressing element 42 is disposed in an inner wall of the claw sleeve 41, and at a front end of the claw sleeve 41. The pressing element 42 extends toward the imaginary central axis AX1, and is separated from the imaginary central axis AX1. Moreover, the pressing element 42 corresponds to the claws 52 of the claw mechanism 50, and is configured to move the claws 52 toward the imaginary central axis AX1. In this embodiment, the pressing element 42 and the claw sleeve 41 are formed integrally of the same material.

As shown in FIG. 3, the main rod 43 is connected to the claw sleeve 41, and in the front cavity 12 and the main cavity 13. The main rod 43 passes through the through hole W11 of the partition wall W1, and extends and is movable along the imaginary central axis AX1. In this embodiment, the main rod 43 is affixed to the claw sleeve 41. The main rod 43 extends into the vacuum channel 15. The main rod 43 contacts an inner wall of the vacuum channel 15, and is movable along the inner wall of the vacuum channel 15. Moreover, the main rod 43 has an inner channel 431 that extends along the imaginary central axis AX1, and penetrates through the main rod 43. The inner channel 431 is connected to the vacuum channel 15.

The main piston 44 is disposed on the main rod 43, and contacts a side wall of the main cavity 13. In this embodiment, the main piston 44 surrounds a rear end of the main rod 43, and extends and can slide along the main cavity 13. A main-dynamic space S2 is formed between the main piston 44 and the partition wall W1, and the main channel 17 is in communication with the main-dynamic space S2. The main-dynamic device A4 can provide a main force to the main-dynamic structure 40 via the main channel 17, thereby moving the main-dynamic structure 40.

In this embodiment, the main-dynamic structure 40 can be moved by adjusting the pressure in the main cavity 13 via the main channel 17. The main-dynamic device A4 can provide the main-force fluid into the main-dynamic space S2 via the main channel 17. When the main-dynamic device A4 provides the main-force fluid into the main-dynamic space S2, the pressure in the main-dynamic space S2 is increased, and thus the main-force fluid pushes the main piston 44 to move toward the first direction D1. In other words, the pressure generated by the main-force fluid in the main-dynamic space S2 forms the main force.

The claw mechanism 50 is movably disposed in the main-dynamic structure 40, and extends and is movable along the imaginary central axis AX1. The claw mechanism 50 includes an extension rod 51 and the claws 52. The extension rod 51 is movable disposed in the main rod 43 of the main-dynamic structure 40, and extends and is movable along the imaginary central axis AX1. The extension rod 51 contacts an inner wall of the inner channel 431 of the main rod 43, and can slide along the inner wall of the inner channel 431. Moreover, the extension rod 51 has an outlet channel 511 that extends along the imaginary central axis AX1 through the extension rod 51. The outlet channel 511 is in communication with the inner channel 431 and the vacuum channel 15.

In this embodiment, the extension rod 51 extends into the claw sleeve 41, and has a claw base 512. The claws 52 are rotatably disposed on an end of the claw base 512, and in the claw sleeve 41, and the front sleeve 31. The claws 52 are configured to clamp the rivet rod E11 of the rivet pin E1. The claw base 512 rotates ends of the claws 52 away from the imaginary central axis AX1. When the claws 52 are open, the outlet channel 511 is in communication with the rivet cavity 11.

Due to an elastic force provided by the claw base 512, the claws 52 can abut against the pressing element 42. In this embodiment, the claws 52 and the pressing element 42 are wedges. When the claws 52 and the pressing element 42 move in opposite directions, the ends of the claws 52 gradually move away from the imaginary central axis AX1, so as to open the claws 52. When the claws 52 are pressed by the pressing element 42, the ends of the claws 52 gradually move toward the imaginary central axis AX1, so as to close the claws 52. When the claws 52 are closed, the claws 52 separate the outlet channel 511 from the rivet cavity 11.

A front elastic element 60 is connected to the main-dynamic structure 40 and the claw mechanism 50. The front elastic element 60 is configured to provide the elastic force to the claw mechanism 50, thereby moving the claw mechanism 50 toward a second direction D2. The second direction D2 is opposite to the first direction D1. In this embodiment, the front elastic element 60 is a spring extending along the imaginary central axis AX1. The extension rod 51 passes through the front elastic element 60. One end of the front elastic element 60 is in the inner channel 431, and the other end of the front elastic element 60 abuts against the claw base 512 of the extension rod 51.

As shown in FIGS. 2 and 3, a main elastic element 70 is disposed in the main cavity 13, and connected to the main-dynamic structure 40. The main elastic element 70 is configured to provide an elastic force to the main-dynamic structure 40, thereby moving the main elastic element 70 in the second direction D2. The elastic force provided by the main elastic element 70 is greater than the elastic force provided by the front elastic element 60. In this embodiment, the main elastic element 70 is a spring extending along the imaginary central axis AX1. The main rod 43 passes through the main elastic element 70. One end of the main elastic element 70 abuts against a rear wall of the main cavity 13, and the other end of the main elastic element 70 abuts against the main piston 44 of the main-dynamic structure 40.

Figure 5A:
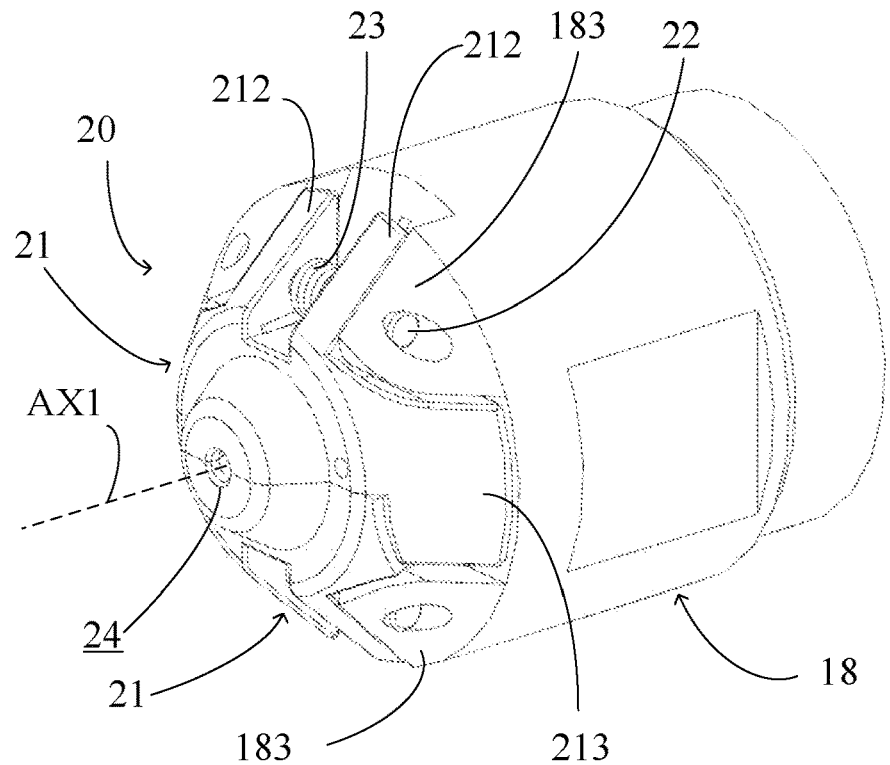
FIG. 5A and FIG. 5B are perspective views of a rivet clamping assembly of the automatic riveting gun of FIG. 1.
Figure 5B:
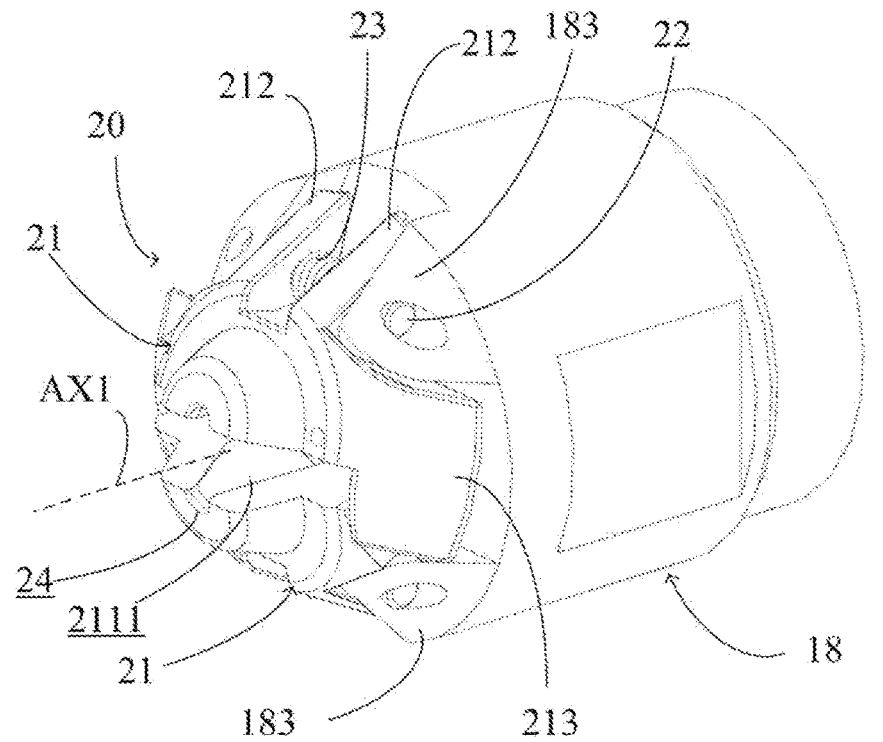
Figure 5C:
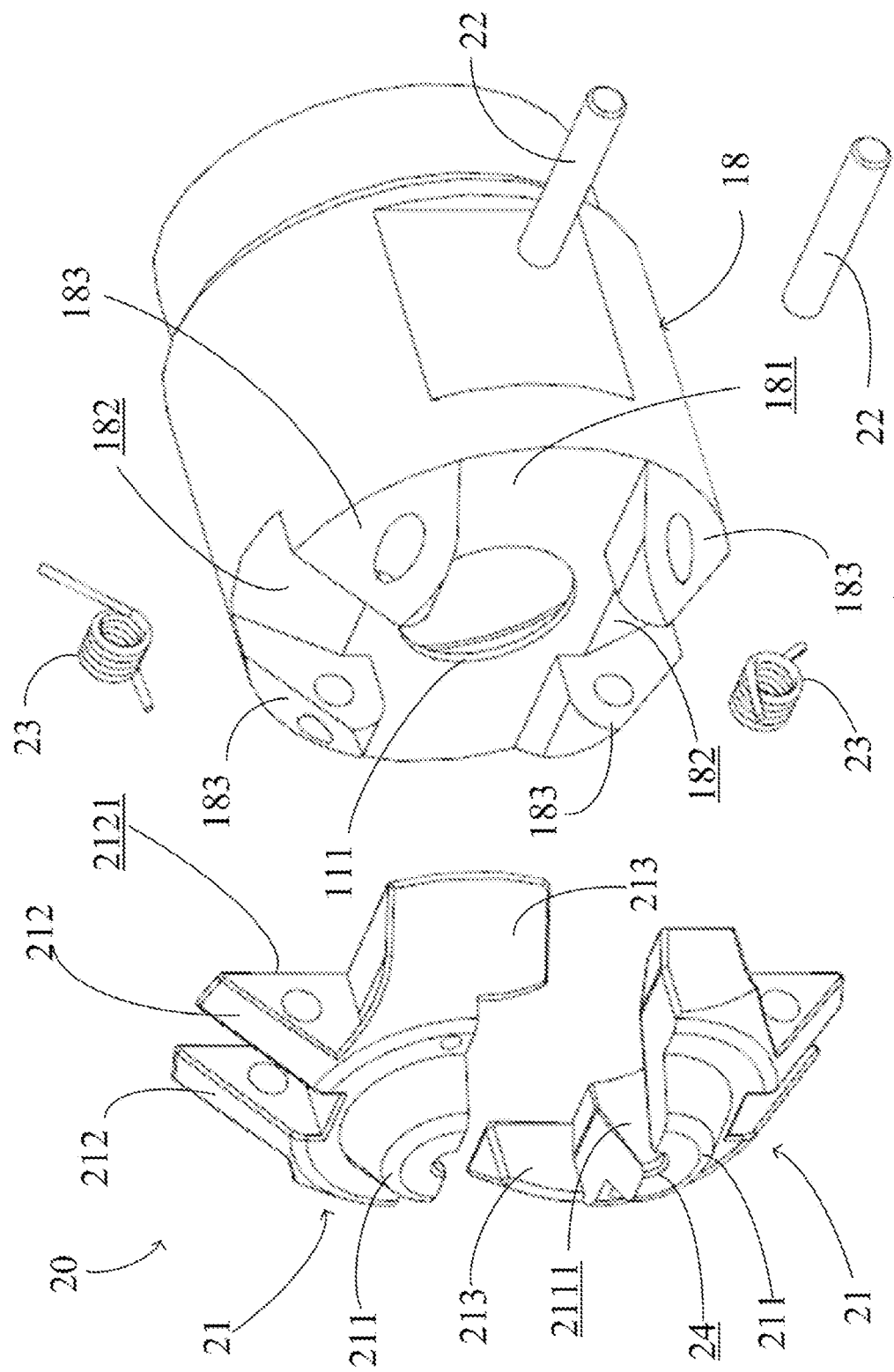
FIG. 5C is an exploded view of the rivet clamping assembly of FIG. 5A.
Figure 5D:
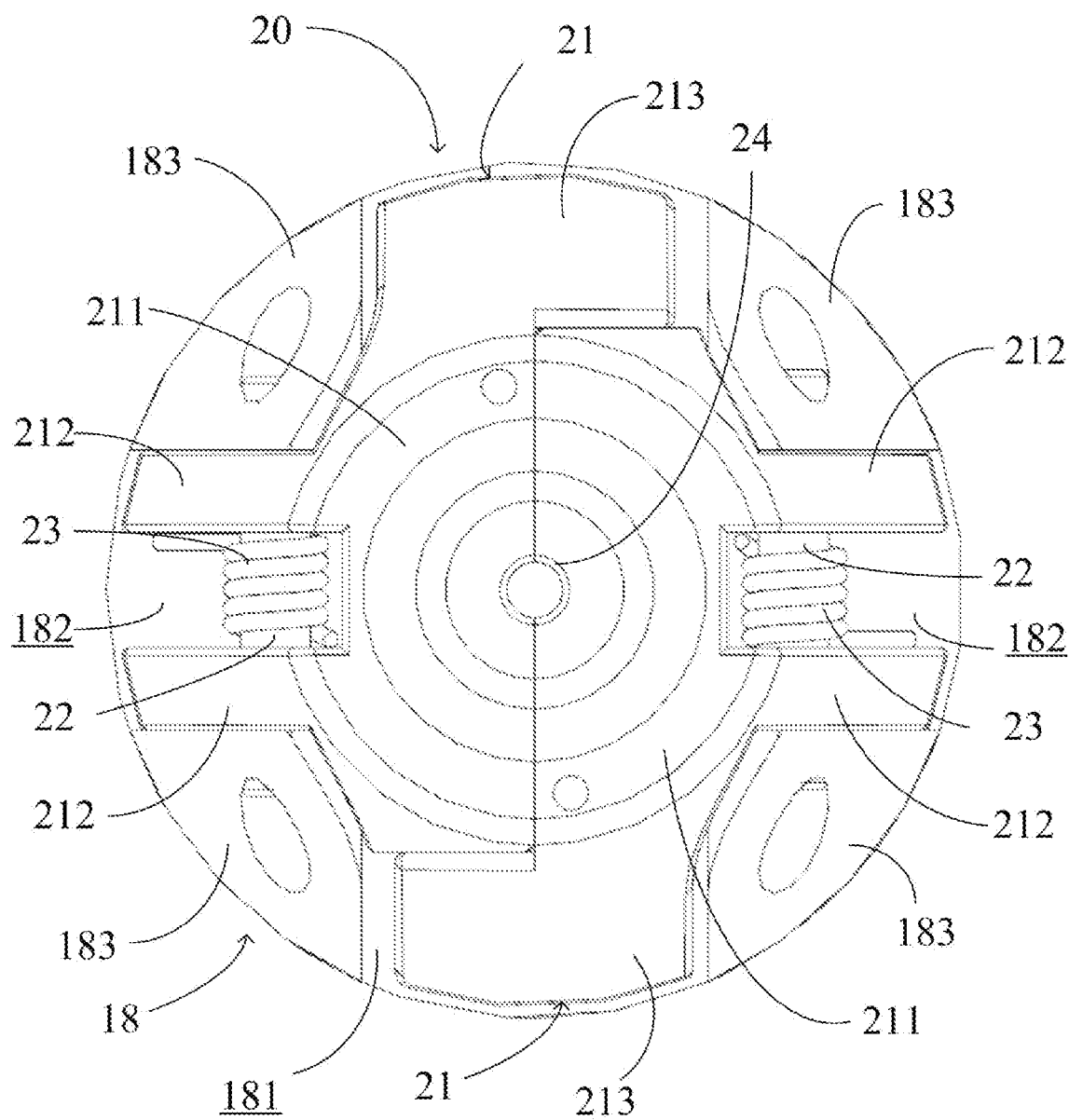
FIG. 5D is a front view of the rivet clamping assembly of FIG. 5A.

FIGS. 5A and 5B show the rivet clamping assembly 20 in accordance with the first embodiment of the present disclosure. In FIG. 5A, the rivet clamping assembly 20 is in a closed position. In FIG. 5B, the rivet clamping assembly 20 is in an open position. FIG. 5C is an exploded view of the rivet clamping assembly 20 of FIG. 5A. FIG. 5D is a front view of the rivet clamping assembly 20 of FIG. 5A. As shown in FIG. 4, the gun body 10 further includes a clamp base 18 that is located at the front side of the gun body 10. The front cavity 12 extends into the clamp base 18. In this embodiment, the rivet clamping assembly 20 is integrated with the clamp base 18 of the gun body 10. When the rivet clamping assembly 20 is assembled, the rivet clamping assembly 20 becomes part of the gun body 10.

In this embodiment, the clamp base 18 has a bearing surface 181, two first limiting surfaces 182, and four pivoting bases 183. The front opening 111 is connected to the bearing surface 181, and at a center of the bearing surface 181. In this embodiment, the bearing surface 181 is a flat surface, and the bearing surface 181 and the front opening 111 extend perpendicular to the imaginary central axis AX1. The front opening 111 may be circular, and a diameter of the front opening 111 corresponding to the greatest width of the rivet pin E1. Therefore, the rivet pin E1 can be removed out of the clamp base 18 through the front opening 111. The two first limiting surfaces 182 are connected to the bearing surface 181, and located at two opposite sides of the bearing surface 181. Moreover, the two first limiting surfaces 182 are inclined relative to the bearing surface 181. The four pivoting bases 183 are disposed on the bearing surface 181, and connected to the two first limiting surfaces 182. The four pivoting bases 183 are separated from each other.

The rivet clamping assembly 20 includes two clamps 21, two shafts 22, and two torque elements 23. The two clamps 21 are disposed on the clamp base 18. Each of the two clamps 21 includes a clamp body 211, two pivoting portions 212, and a sealing portion 213. The clamp body 211, the two pivoting portions 212, and the sealing portion 213 may be formed as a single piece. The two pivoting portions 212 are connected to the clamp body 211, and at the same side of the clamp body 211. The two pivoting portions 212 are separated from each other. The two pivoting portions 212 are between two adjacent pivoting bases 183. The sealing portion 213 is connected to the clamp body 211, and between two of the four pivoting bases 183.

The two shafts 22 extend perpendicular to the imaginary central axis AX1. One of the two shafts 22 passes through the two adjacent pivoting bases 183 and the two pivoting portions 212 that are between the two adjacent pivoting bases 183. Moreover, the one of the two shafts 22 passes through one of the two torque elements 23. In this embodiment, two ends of the one of the two shafts 22 are affixed to the two adjacent pivoting bases 183, and the one of the two shafts 22 is rotatable relative to the two pivoting portions 212. Each of the two torque elements 23 is disposed on one of the two shafts 22, and between two adjacent pivoting portions 212. The two torque elements 23 provide torque between the two clamps 21 and the clamp base 18.

In this embodiment, when the two clamps 21 are in the closed position, a rivet hole 24 is formed between the two clamps 21. A diameter of the rivet hole 24 corresponds to a diameter of the rivet rod E11. The sealing portion 213 of one of the two clamps 21 covers a side surface of the other one of the two clamps 21. Moreover, the two clamps 21 attach to the bearing surface 181. When the rivet pin E1 is pulled, the bearing surface 181 is designed to withstand the great pressure from the two clamps 21, the structural strength of the automatic riveting gun 1 is high.

In the front view of FIG. 5D, a Z-shaped seam is presented between the two clamps 21. Moreover, when the two clamps 21 clamp the rivet rod E11, the two clamps 21, the rivet hole 24, and the rivet rod E11 form a sealed structure. Therefore, with the sealed structure of the rivet clamping assembly 20 of the present disclosure, any loss of vacuum suction force inside the gun body 10 is reduced.

In this embodiment, the clamp body 211 has a tapered surface 2111, connected to the rivet hole 24. When the rivet pin E1 is pushed from an inside of the rivet cavity 11, a rivet head E12 slides along the tapered surface 2111. The rivet head E12 pushes ends of the two clamps 21 to rotate away from the imaginary central axis AX1, thereby opening the two clamps 21 (as shown in FIG. 5B). Therefore, with the design of the tapered surface 2111 of the clamp body 211, the rivet pin E1 can smoothly push the rivet clamping assembly 20. Moreover, when the rivet head E12 rotates the ends of the two clamps 21 away from the imaginary central axis AX1, the two first limiting surfaces 182 of the clamp base 18 limit a rotation angle of the two clamps 21, to prevent the rivet pin E1 from falling out of the rivet clamping assembly 20. In this embodiment, when the two clamps 21 are open, second limiting surfaces 2121 of the two pivoting portions 212 of each of the two clamps 21 abut and attach on one of the two first limiting surfaces 182.

Figure 6:
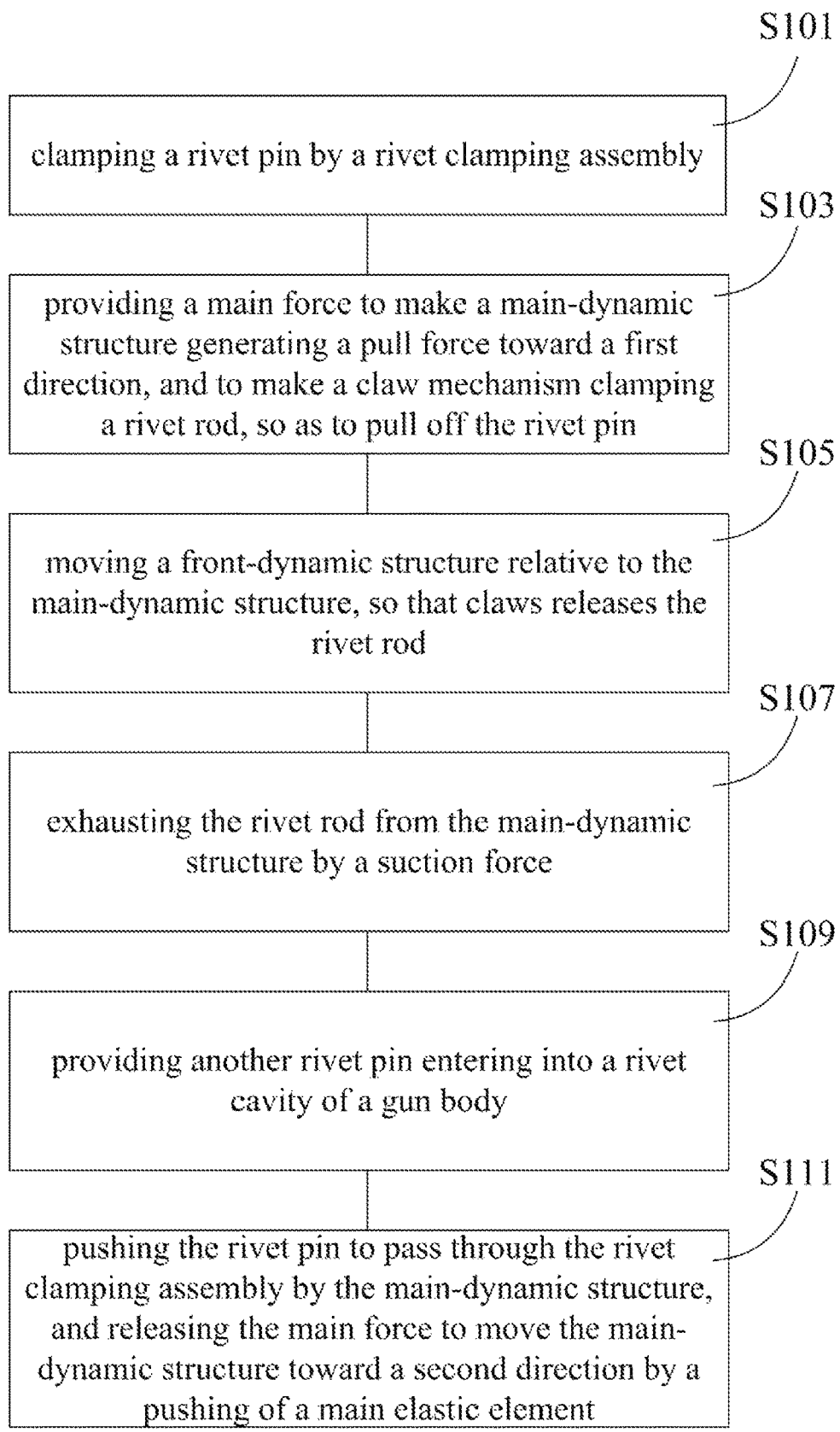
FIG. 6 is a flow chart of an operating method of the automatic riveting gun of the first embodiment of the present disclosure.

FIG. 6 is a flow chart of an operating method of the automatic riveting gun 1 of the first embodiment of the present disclosure. FIGS. 7A to 7D show the intermediate stages of the automatic riveting gun during operation. The operating method of the automatic riveting gun 1 can be performed by the following steps. In step S101, the rivet pin E1 is clamped by the rivet clamping assembly 20. The rivet head E12 of the rivet pin E1 abuts against the rivet clamping assembly 20, and protrudes over the rivet clamping assembly 20. The rivet rod E11 is in the rivet cavity 11, and penetrates through the front opening 111 to the rivet clamping assembly 20. Moreover, an end of the rivet rod E11 is in the claws 52 of the claw mechanism 50, the claw sleeve 41, and the front sleeve 31.

Figure 7A:
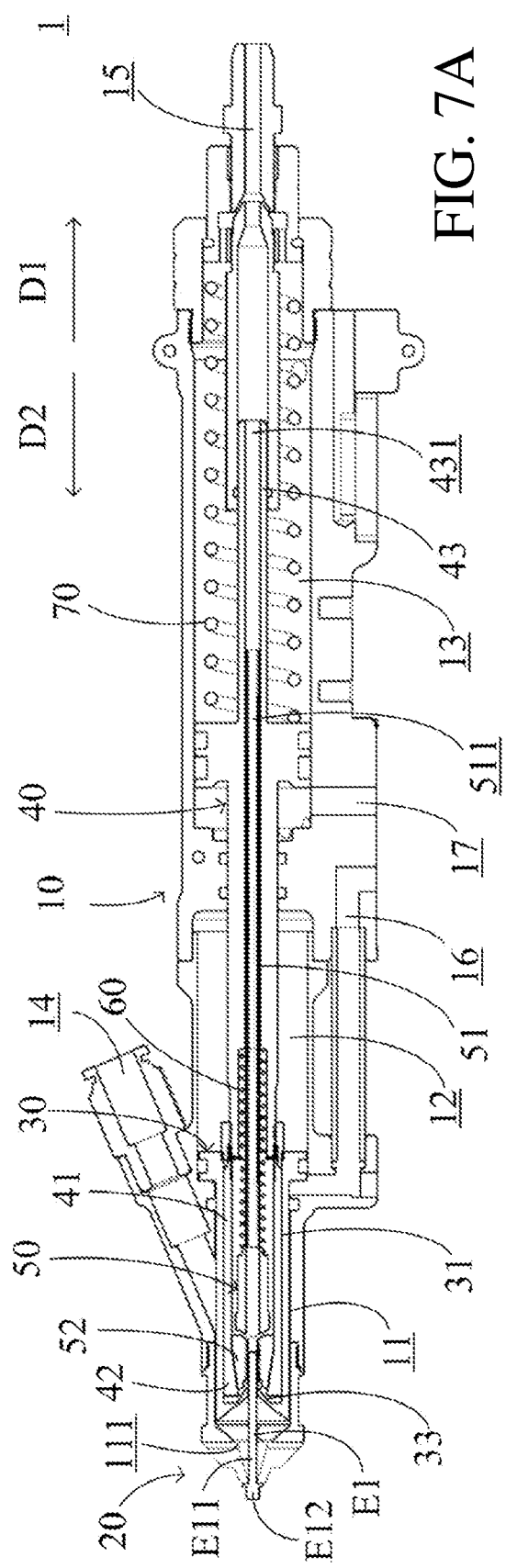
FIGS. 7A to 7D show the intermediate stages of the automatic riveting gun during operation.

As shown in FIGS. 3 and 7A, the front-dynamic structure 30, the main-dynamic structure 40, and the claw mechanism 50 are in an initial position. The front-dynamic device A3 stops providing the front force to the front-dynamic structure 30, and the main-dynamic device A4 stops providing the main force to the main-dynamic structure 40. By the elastic force of the front elastic element 60 applied to the front-dynamic structure 30, and the elastic force of the main elastic element 70 applied to the main-dynamic structure 40, the front-dynamic structure 30 abuts against the front end of the front cavity 12, and the claw sleeve 41 abuts against or adjacent to the blocking portion 33.

Moreover, front ends of the claws 52 abut against the blocking portion 33. Since the elastic force provided by the main elastic element 70 is greater than the elastic force provided by the front elastic element 60, the claws 52 are pushed into the claw sleeve 41 by the blocking portion 33, thereby opening the claws 52. In this embodiment, the vacuum device A2 in FIG. 3 provides the suction force to the vacuum channel 15. Since the vacuum channel 15 is in communication with the outlet channel 511, the vacuum device A2 applies the suction force to the rivet rod E11, preventing the rivet pin E1 from falling out of the rivet clamping assembly 20.

In step S103, as shown in FIGS. 3 and 7A, when a user wants to fasten an object with the rivet pin E1, the user can insert the rivet head E12 of the rivet pin E1 into the object, and press the button B1. After the button B1 is triggered, the trigger signal is sent to the control device A5. The control device A5 further operates the rivet-supply device A1, the vacuum device A2, the front-dynamic device A3, and the main-dynamic device A4. In step S103, after receiving the trigger signal, the control device A5 starts the main-dynamic device A4. The main-dynamic device A4 provides the main force to make the main-dynamic structure 40 pull in the first direction D1.

Figure 7B:
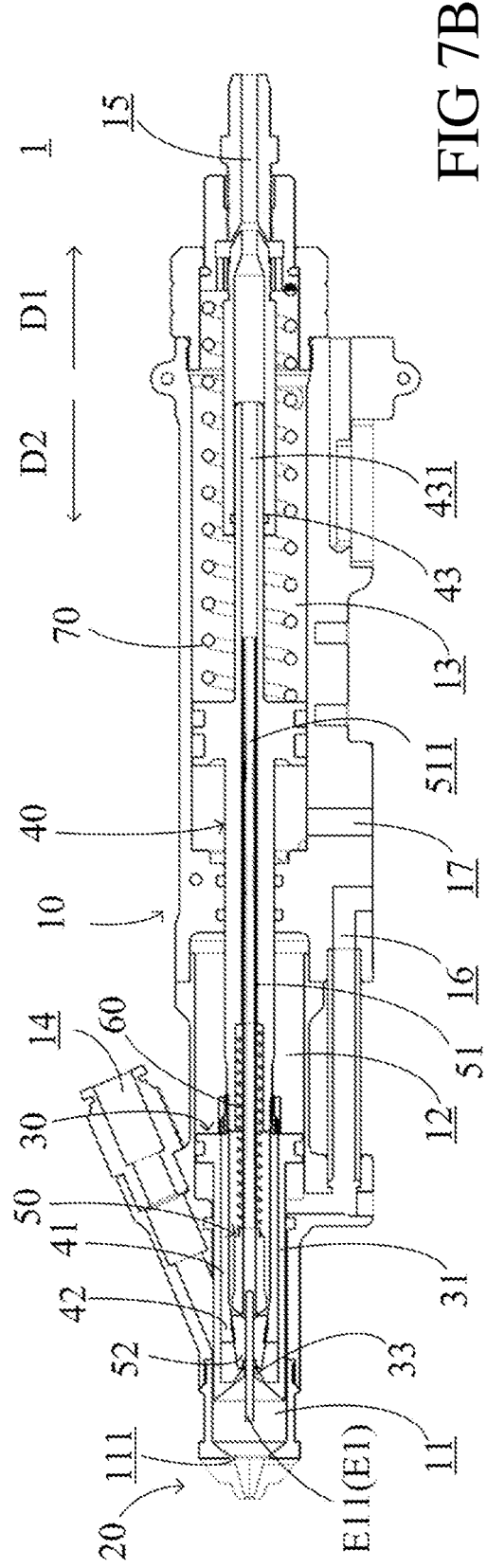

As shown in FIG. 7B, due to the elastic force of the front elastic element 60 to the claw mechanism 50, and the pulling force of the main-dynamic structure 40, the claws 52 abut against the pressing element 42, and are pressed by the pressing element 42. The front ends of the claws 52 protrudes over the claw sleeve 41 by the elastic force of the front elastic element 60. The claws 52 abut against the pressing element 42, and clamp the rivet rod E11 by the pressing of the pressing element 42. Finally, the rivet pin E1 is pulled off (the rivet head E12 is separated from the rivet rod E11 in FIG. 7A) by the pulling force of the main-dynamic structure 40.

In step S105, as shown in FIGS. 3 and 7B, when the main-dynamic device A4 provides the main force for a predetermined time, the control device A5 starts the front-dynamic device A3. The front-dynamic device A3 provides the front force to cause the front-dynamic structure 30 to pull toward the first direction D1, and move the front-dynamic structure 30 relative to the main-dynamic structure 40 in the first direction D1. The predetermined time is in a range of 0.1 second to 1 second, but it is not limited thereto. In other words, the front-dynamic device A3 provides the front force when the rivet rod E11 is separated from the rivet head E12, and the claws 52 are moved a predetermined distance in the first direction D1. The predetermined distance may be 0.2 times to 0.8 times a length of the rivet cavity 11 in the first direction D1, but it is not limited thereto.

Figure 7C:
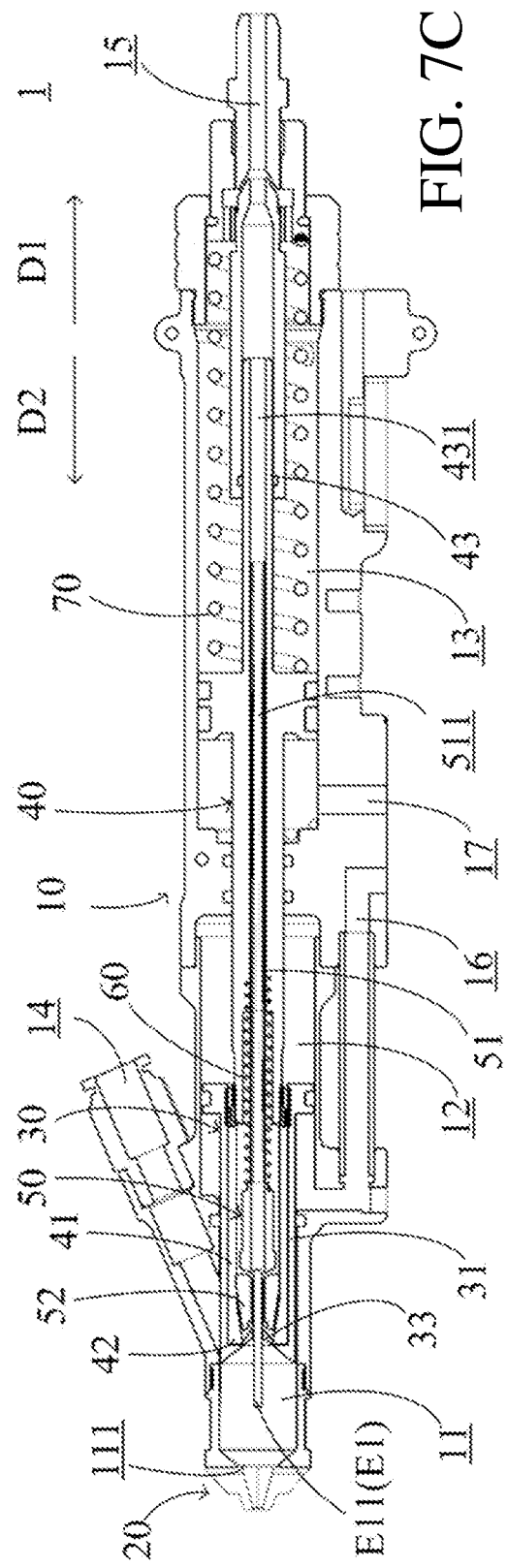

As shown in FIG. 7C, the front-dynamic structure 30, the main-dynamic structure 40, and the claw mechanism 50 are in an exhausting position. Since the pulling force of the front-dynamic structure 30 is greater than the elastic force of the front elastic element 60, the blocking portion 33 of the front-dynamic structure 30 pushes the claws 52 toward the first direction D1, so that the claws 52 release relative to the pressing element 42. Therefore, the front ends of the claws 52 are retracted into the claw sleeve 41. The claws 52 are opened, so that the claws 52 release the rivet rod E11.

In step S107, as shown in FIGS. 3 and 7C, when the claws 52 are opened, and the suction force is provided by the vacuum device A2 for the vacuum channel 15, the rivet rod E11 is exhausted from an inside of the main-dynamic structure 40.

By the suction force of the vacuum device A2 to the vacuum channel 15, the rivet rod E11 is exhausted from the inside of the main-dynamic structure 40. In this embodiment, the rivet rod E11 is exhausted from the automatic riveting gun 1 to the pipe T2 via the outlet channel 511 of the extension rod 51, the inner channel 431 of the main rod 43, and the vacuum channel 15 in sequence in the first direction D1.

Figure 7D:
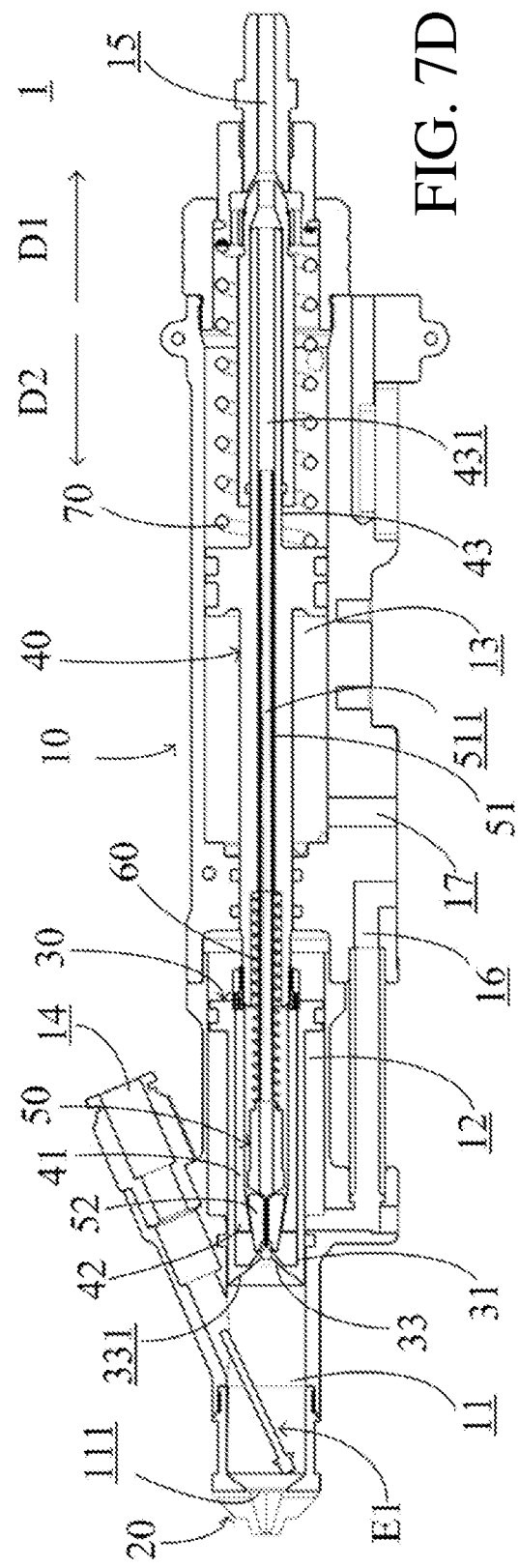

In step S109, as shown in FIGS. 3 and 7D, after the front-dynamic device A3 provides the front force for a predetermined time, the control device A5 stops the front-dynamic device A3. The predetermined time is in a range form 0.1 second to 1 second, but it is not limited thereto. After the front-dynamic device A3 releases the front force, the elastic force of the front elastic element 60 in the second direction D2 is then greater than the pulling force of the front force applying the front-dynamic structure 30 in the first direction D1, so that the front elastic element 60 pushes the claw mechanism 50, and the claws 52 can be pressed by the pressing element 42. Thus, the claws 52 are closed by the pressing of the pressing element 42.

As shown in FIG. 7D, the front-dynamic structure 30, the main-dynamic structure 40, and the claw mechanism 50 are in a feeding position. The front-dynamic structure 30, the claw sleeve 41, and the claws 52 are away from the rivet clamping assembly 20. At least 70% of the volume of the front-dynamic structure 30 and the claw sleeve 41 is in the front cavity 12, but it is not limited thereto. The inlet channel 14 is in communication with the rivet cavity 11, and an opening between the inlet channel 14 and the rivet cavity 11 is not covered by the front-dynamic structure 30.

Afterwards, as shown in FIGS. 3 and 7D, the control device A5 starts the rivet-supply device A1 to feed another rivet pin E1 into the rivet cavity 11 via the inlet channel 14. Since the claws 52 are closed, the rivet rod E11 of the rivet pin E1 is prevented from entering into the outlet channel 511 by the suction force provided by the vacuum device A2.

In step S111, the control device A5 controls the main-dynamic device A4 to stop working, so as to release the main force. At this time, the elastic force of the main elastic element 70 in the second direction D2 is greater than the pulling force of the main-dynamic structure 40 in the first direction D1. Therefore, the main-dynamic structure 40 is pushed toward the second direction D2 by the main elastic element 70, and the main-dynamic structure 40 pushes the rivet pin E1 to pass through the rivet clamping assembly 20. The rivet head E12 of the rivet pin E1 is exposed in the rivet clamping assembly 20.

Accordingly, the automatic riveting gun 1 of the present disclosure enables quick supply of the rivet pin E1 in the gun body 10, without the need to manually install a rivet pin E1 in the automatic riveting gun 1, also reducing the risk of user-injury by feeding mechanisms.

In this embodiment, the blocking portion 33 has an outer slope 331 inclined relative to the imaginary central axis AX1. Therefore, when the blocking portion 33 pushes the rivet rod E11 toward the second direction D2, the end of the rivet rod E11 slides along the outer slope 331 to the position of the imaginary central axis AX1 and contacts the front ends of the claws 52.

As the main-dynamic structure 40 continues to move in the second direction D2, the front-dynamic structure 30, the main-dynamic structure 40, and the claw mechanism 50 are returned to the initial position as shown in FIG. 7A, and the process of step S101 is executed. Due to the elastic force of the main elastic element 70, the main-dynamic structure 40 pushes the front-dynamic structure 30 to abut against the front end of the front cavity 12, so that the claw sleeve 41 abuts against or is adjacent to the blocking portion 33. Due to the elastic force of the front elastic element 60, the open state of the claws 52 can be maintained by the blocking portion 33 of the front-dynamic structure 30.

In this embodiment, since the elastic force of the main elastic element 70 is greater than the elastic force of the front elastic element 60, the blocking portion 33 enters into the claw sleeve 41 and pushes the pressing element 42 against the claws 52, opening the claws 52. A rivet rod E11 of a second rivet pin E1 enters into the claw mechanism 50 by the suction force, and thus the rivet rod E11 of the second rivet pin E1 can move into the claws 52 and the outlet channel 511.

When the user pushes the button B1 again, the automatic riveting system automatically executes steps S103 to S111, and returns to step S101 to wait for the user to perform the riveting operation. For example, the time from the user pressing the button B1 (step S103) to the rivet rod E11 being exhausted out of the automatic riveting gun 1 (step S107) may be about 0.6 seconds, but it is not limited thereto. Moreover, the time from the rivet pin E1 entering into the rivet cavity 11 (step S109) to the automatic riveting gun 1 returning to the initial position (step S101) may be about 0.5 seconds, but it is not limited thereto. In other words, the automatic riveting gun 1 takes about 1.1 seconds from when the user presses the button B1 to the automatic riveting gun 1 returning to the initial position, but it is not limited thereto. Therefore, the automatic riveting gun 1 of the present disclosure utilizes various dynamic forces to achieve automatic and rapid operation, such as riveting objects, vacuum-extracting rivet rod, and feeding rivets, and thus the production efficiency is improved.

Figure 8:
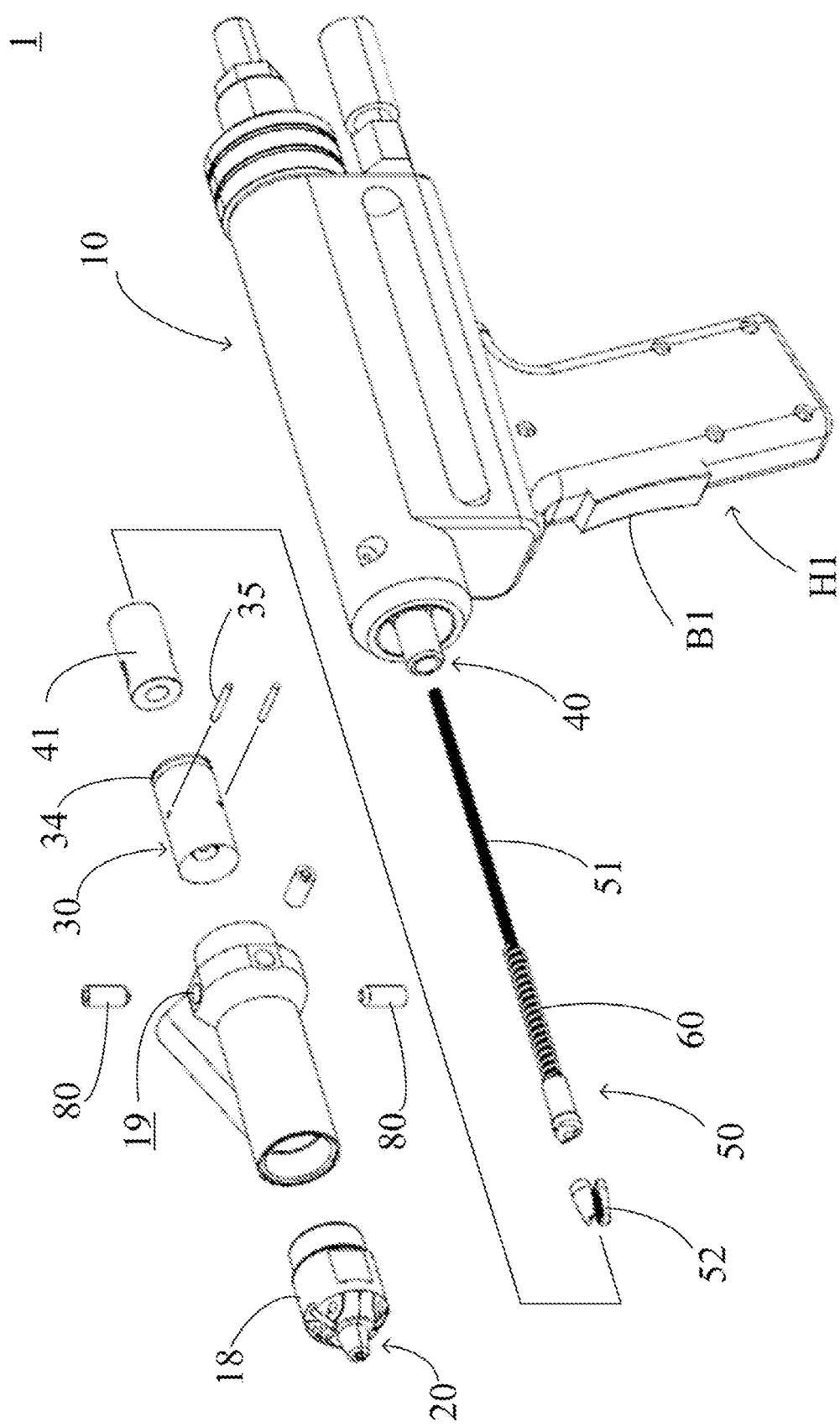
FIG. 8 is an exploded view of an automatic riveting gun in accordance with a second embodiment of the present disclosure.
Figure 9:
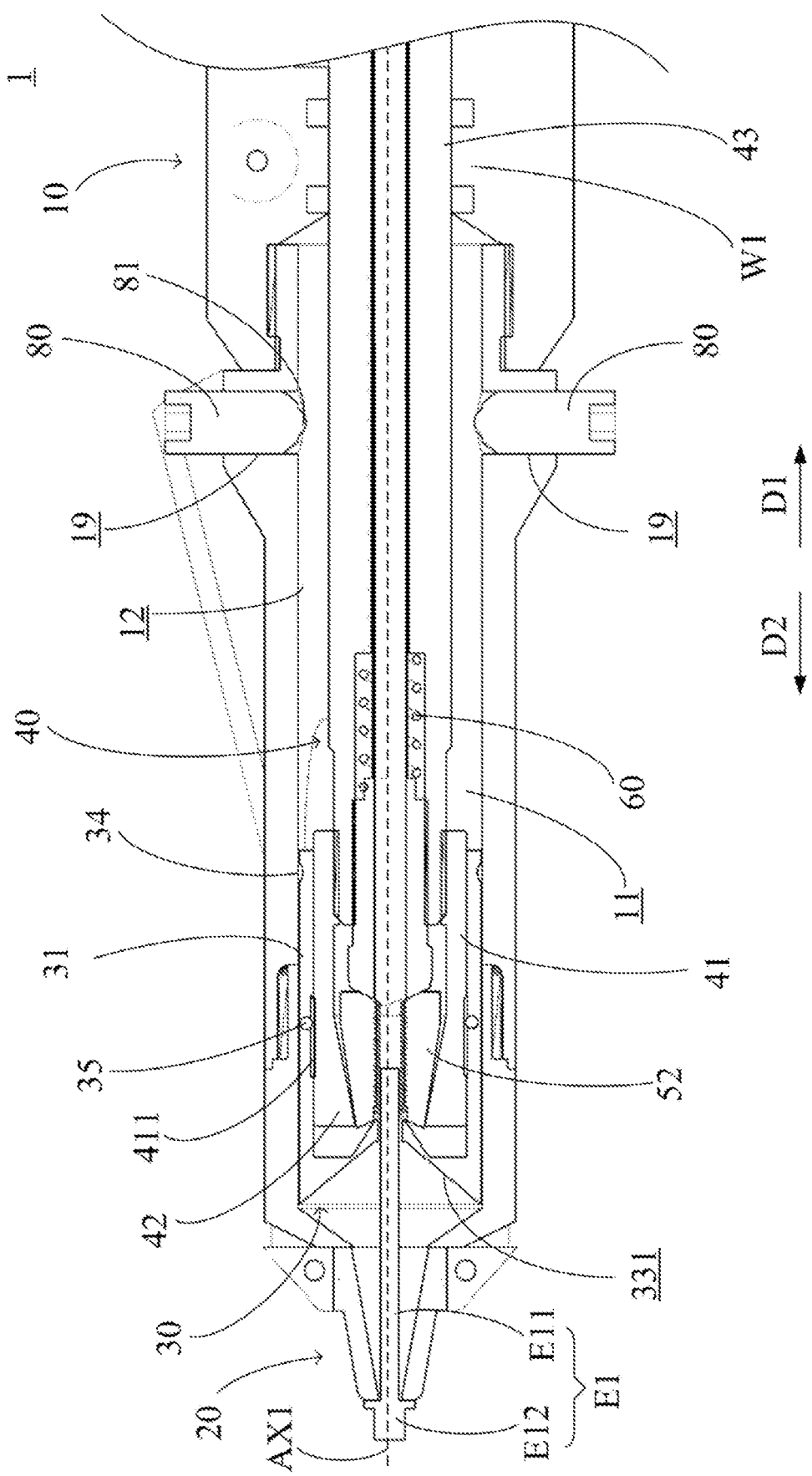
FIG. 9 is a cross-sectional view of partial automatic riveting gun of FIG. 8.

FIG. 8 is an exploded view of the automatic riveting gun 1 in accordance with a second embodiment of the present disclosure. FIG. 9 is a cross-sectional view of the automatic riveting gun 1 of FIG. 8. The automatic riveting gun 1 and the automatic riveting system of the second embodiment are similar to those of the first embodiment.

In the second embodiment, the automatic riveting gun 1 may not include the front channel 16 and the front-dynamic device A3 of the first embodiment. In other words, the second embodiment does not need the front-force fluid to be injected into the front cavity 12. Moreover, in the second embodiment, the diameters of the rivet cavity 11 and the front cavity 12 can be the same. The diameters of rivet cavity 11 and the front cavity 12 can be measured in a direction perpendicular to the imaginary central axis AX1.

In the second embodiment, the automatic riveting gun 1 further includes spring pins 80, and the gun body 10 further includes side openings 19. The side openings 19 are in communication with the front cavity 12, and adjacent to the partition wall W1. The extension of the side openings 19 is perpendicular to the imaginary central axis AX1. Each of the spring pins 80 is movably disposed in one of the side openings 19, and an end 81 of the each of the spring pins 80 protrudes into the front cavity 12. In this embodiment, the end 81 of the each of the spring pins 80 has a curved surface. There are three spring pins 80, not being limited thereto. In some embodiments, there are one or at least two spring pins 80. Moreover, the number of the side openings 19 is equal to the number of the spring pins 80.

In the second embodiment, the front-dynamic structure 30 may not include the front piston 32. The front-dynamic structure 30 has one or more positioning grooves 34 at an outer side of the front sleeve 31. The positioning grooves 34 may be in a curved shape that may correspond to the shape of the end 81 of the each of the spring pins 80. When the spring pins 80 are in the positioning grooves 34, the spring pins 80 limit the movement of the front-dynamic structure 30. In this embodiment, the positioning grooves 34 may be a ring-like shape that surrounds the front sleeve 31. In some embodiments, the number of the positioning grooves 34 corresponds to the number of the spring pins 80.

In the second embodiment, the claw sleeve 41 further includes at least one slipping groove 411 at an outer wall of the claw sleeve 41. The at least one slipping groove 411 extends parallel to the imaginary central axis AX1. In other words, the at least one slipping groove 411 can extend in the first direction D1 or in the second direction D2. A length of the slipping groove 411 is 0.1 times to 0.5 times a length of the claw sleeve 41. The length of the slipping groove 411 is measured in a direction that is parallel to the imaginary central axis AX1. The front-dynamic structure 30 further includes a positioning element 35 that is disposed on the inner wall of the front sleeve 31, and is in the at least one slipping groove 411.

In this embodiment, the positioning element 35 and the at least one slipping groove 411 limit the movement of the front-dynamic structure 30 and the claw sleeve 41. The front-dynamic structure 30 is prevented from leaving the claw sleeve 41 during the movement of the front-dynamic structure 30 and the main-dynamic structure 40, or the front-dynamic structure 30 is prevented from moving too far relative to the claw sleeve 41, which would damage the automatic riveting gun 1 or cause it to be inoperable.

Figure 10A:
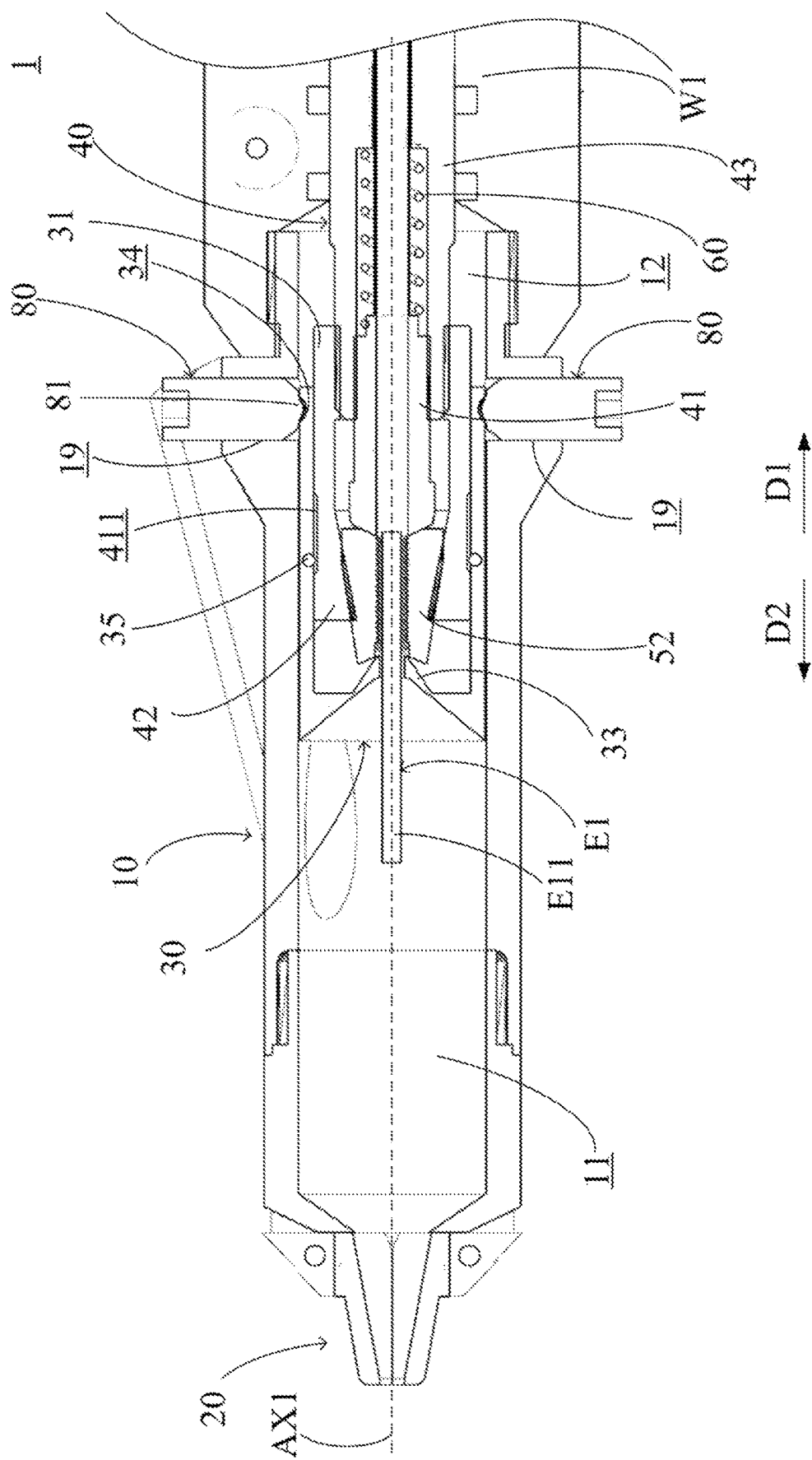
FIGS. 10A to 10C show the intermediate stages of the automatic riveting gun during operation.
Figure 10B:
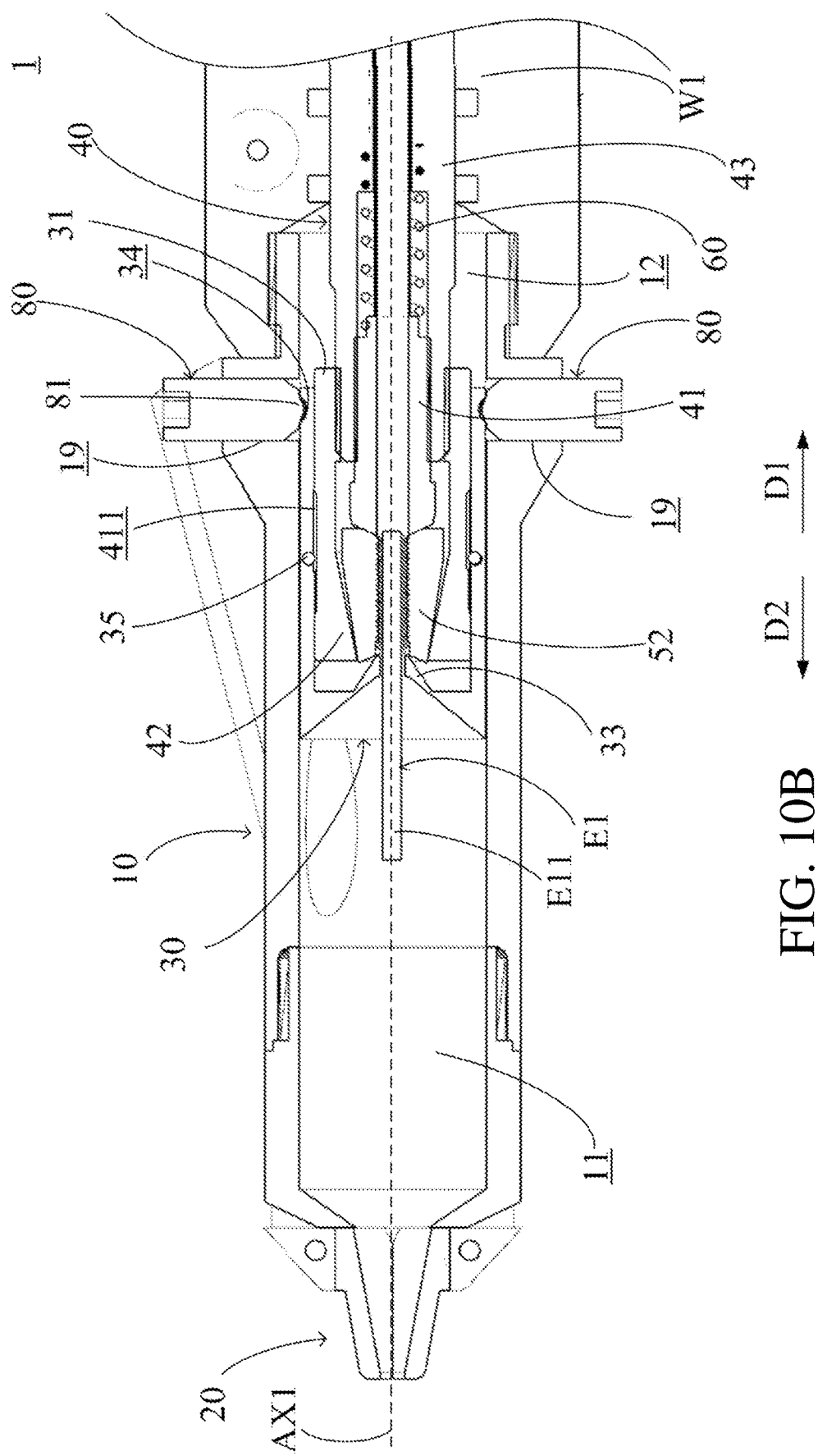
Figure 10C:
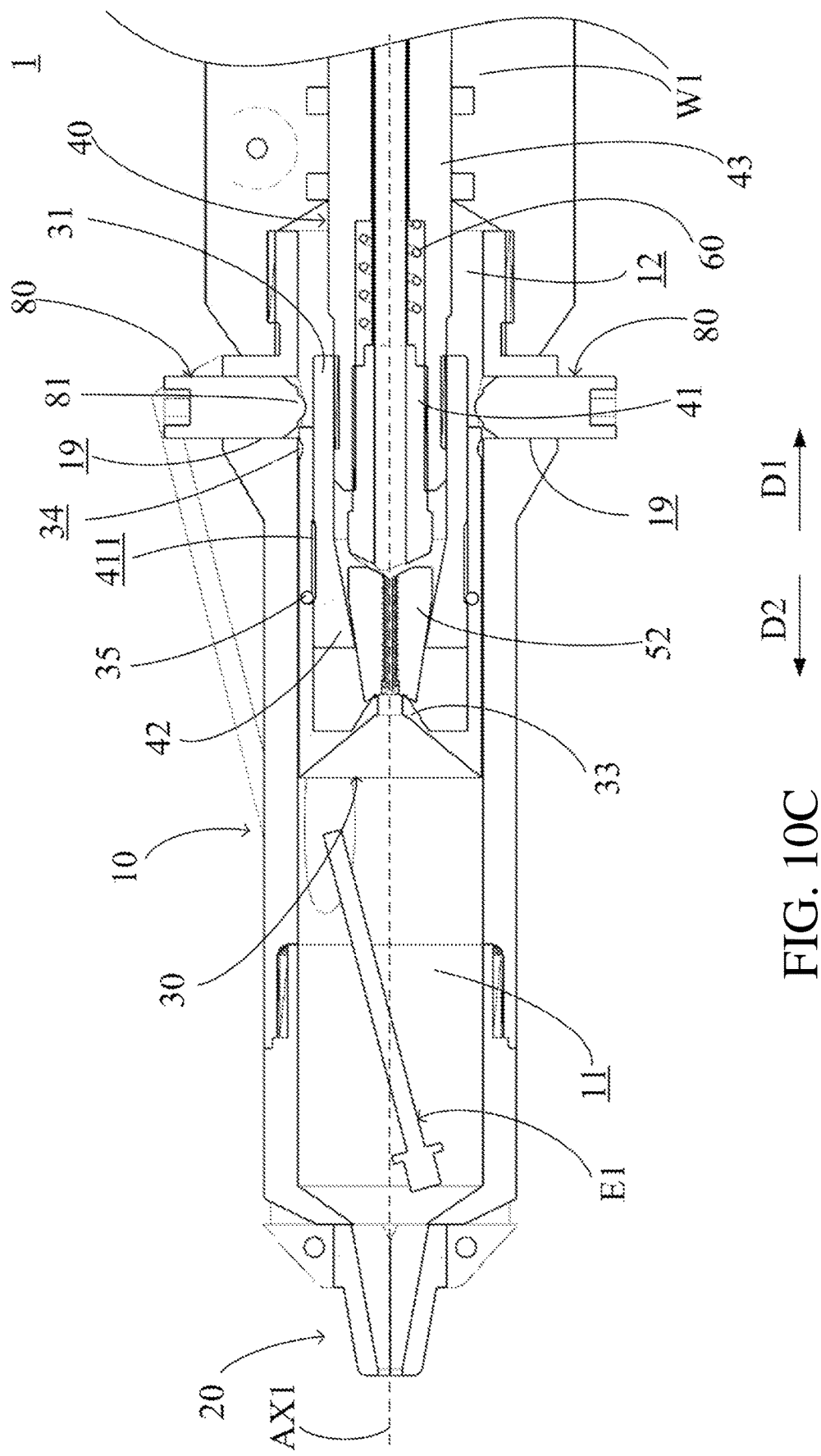

FIGS. 10A to 10C show the intermediate stages of the automatic riveting gun during operation. Since the operating method of the second embodiment is similar to the operating method of the first embodiment, the operating method of the second embodiment can refer to FIG. 6 and the description of steps S101 to S111 of the first embodiment. The following description of the operating method of the second embodiment is simplified.

The operating method of the automatic riveting gun 1 of the second embedment can be performed through the following steps. In step S101, as shown in FIG. 9, the rivet clamping assembly 20 clamps the rivet pin E1. In step S103, as shown in FIG. 10A, the main-dynamic structure 40 generates the pulling force in the first direction D1 by the main force. The claws 52 of the claw mechanism 50 clamp the rivet rod E11, so as to pull off the rivet pin E1 of FIG. 9, and then move the rivet rod E11 in the first direction D1.

In step S105, as shown in FIG. 10A, when the main-dynamic structure 40 moves the front-dynamic structure 30 in the first direction D1, the positioning grooves 34 of the front-dynamic structure 30 passes through the ends 81 of the spring pins 80. By an elastic force of the spring pins 80, the ends 81 of the spring pins 80 extend into the positioning grooves 34, and the front-dynamic structure 30 stops moving in the first direction D1. As shown in FIG. 10B, when the ends 81 of the spring pins 80 are in the positioning grooves 34, the main force is released, thus the main-dynamic structure 40 is moved in the second direction D2 by the elastic force of the main elastic element 70 (as shown in FIG. 7C). At this time, the blocking portion 33 of the front-dynamic structure 30 prevents the claws 52 moving in the second direction D2, thus the pressing element 42 operates to open the claws 52. Thereby, the claws 52 release the rivet rod E11.

In step S107, as shown in FIG. 10B, the claws 52 are open. The rivet rod E11 can be exhausted from an inner side of the main-dynamic structure 40 by the suction force. In step S109, as shown in FIG. 10C, when main-dynamic structure 40 moves in the second direction D2, the front-dynamic structure 30 is pushed in the same direction, exposing the ends 81 of the spring pins 80 from the positioning grooves 34. After the ends 81 of the spring pins 80 leave the positioning grooves 34, the front-dynamic structure 30 is movable. In other words, the front-dynamic structure 30 can be moved relative to the front cavity 12.

Afterwards, the front elastic element 60 pushes the claw mechanism 50 against the claws 52 to push the blocking portion 33 of the front-dynamic structure 30 in second direction D2, so that the claws 52 are pressed by the pressing element 42. Thereby, the claws 52 protrude over the claw sleeve 41, and the claws 52 are closed by the pressing element 42. Afterwards, as shown in FIG. 10C, the front-dynamic structure 30, the main-dynamic structure 40, and the claw mechanism 50 are in the feeding position, and another rivet pin E1 can enter into the rivet cavity 11.

In step S111, as shown in FIG. 9, the main-dynamic structure 40 pushes the another rivet pin E1 to pass though the rivet clamping assembly 20, and the rivet rod E11 enters into the claw mechanism 50 by the suction force. After that, the step S101 is executed. After the user presses the button B1 again, the automatic riveting system automatically performs steps S103 to S111, and returns to step S101 to wait for the user to perform the riveting action.

Many details are often found in the art such as the other features of riveting gun. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An automatic riveting gun comprising:
   a gun body comprising a rivet cavity, a front cavity, and a main cavity;
   a rivet clamping assembly disposed on the gun body and adjacent to the rivet cavity;
   a front-dynamic structure movably disposed in the rivet cavity and the front cavity;
   a main-dynamic structure movably disposed in the front cavity and the main cavity, and comprising a claw sleeve in the front-dynamic structure;
   a claw mechanism movably disposed in the main-dynamic structure;
   a front elastic element connected to the main-dynamic structure and the claw mechanism, and configured to provide an elastic force to the claw mechanism; and
   a main elastic element connected to the main-dynamic structure, and configured to provide an elastic force to the main-dynamic structure.

2. The automatic riveting gun as claimed in claim 1, wherein the main-dynamic structure further comprises: a main rod connected to the claw sleeve, and in the front cavity and the main cavity, wherein the gun body comprises a partition wall between the front cavity and the main cavity, and the main rod passes through the partition wall; and a main piston disposed on the main rod, and contacting with a side wall of the main cavity.

3. The automatic riveting gun as claimed in claim 2, wherein a main dynamic space is between the main piston and the partition wall, and a main channel is in communication with the main dynamic space, wherein a main-dynamic device provides main-force fluid into the main dynamic space via the main channel.

4. The automatic riveting gun as claimed in claim 1, wherein the front-dynamic structure further comprises:
   a front sleeve movably disposed on the claw sleeve; and
   a front piston disposed on the front sleeve, and contacting with a side wall of the front cavity.

5. The automatic riveting gun as claimed in claim 4, wherein a front-dynamic space is between the front piston and the front cavity, and a front channel is in communication with the front-dynamic space, wherein a front-dynamic device provides front-force fluid into the front-dynamic space via the front channel.

6. The automatic riveting gun as claimed in claim 1, wherein the claw mechanism further comprises:
   an extension rod movably disposed in the main-dynamic structure, extending into the claw sleeve, and comprising a claw base;
   a plurality of claws rotatably disposed on the claw base and in the claw sleeve;
   wherein the extension rod comprises an outlet channel, and when the plurality of claws are opened, the outlet channel is in communication with the rivet cavity.

7. The automatic riveting gun as claimed in claim 1, wherein the claw mechanism further comprises a plurality of claws, the front-dynamic structure further comprises a blocking portion configured to block or push the plurality of claws, and the main-dynamic structure further comprises a pressing element disposed in the claw sleeve, and corresponding to the plurality of claws, wherein the plurality of claws and the pressing element are wedges,
   wherein when the plurality of claws and the pressing element move in opposite directions, front ends of the plurality of claws gradually move away from an imaginary central axis, and when the plurality of claws are pressed by the pressing element, the front ends of the plurality of claws gradually move in the imaginary central axis.

8. The automatic riveting gun as claimed in claim 1, wherein the gun body further comprises an inlet channel in communication with the rivet cavity, and a vacuum channel in communication with the main cavity, wherein a rivet pin enters into the rivet cavity via the inlet channel, and a rivet rod of the rivet pin is exhausted from the vacuum channel.

9. The automatic riveting gun as claimed in claim 1, wherein the gun body further comprises a clamp base, the rivet cavity extends into the clamp base, and the rivet clamping assembly comprises:
   two clamps disposed on the clamp base;
   two shafts passing through the clamp base and the two clamps; and
   two torque elements disposed on the two shafts, and configured to provide torque between the two clamps and the clamp base,
   wherein when the two clamps are in a closed position, a rivet hole is formed between the two clamps.

10. The automatic riveting gun as claimed in claim 1, further comprising a spring pin movably disposed in a side opening of the gun body, and the front-dynamic structure comprising a positioning groove, wherein when the spring pin is in the positioning groove, the spring pin limits a movement of the front-dynamic structure,
    wherein the claw sleeve comprises a slipping groove, and the front-dynamic structure comprises a positioning element that is in the slipping groove.

* * * * *